United States Patent
Shippee (10) Patent No.: US 7,260,416 B2
(45) Date of Patent: Aug. 21, 2007

(54) SHARED RECEIVE PATH FOR SIMULTANEOUS RECEIVED SIGNALS

(75) Inventor: Geoffrey Shippee, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/349,270

(22) Filed: Jan. 21, 2003

(65) Prior Publication Data

US 2004/0142723 A1    Jul. 22, 2004

(51) Int. Cl.
H04M 1/00    (2006.01)
(52) U.S. Cl. .................. 455/552.1; 455/553.1
(58) Field of Classification Search ............ 455/552.1, 455/553.1, 324, 132, 137, 133
See application file for complete search history.

(56) References Cited

U.S. PATENT DOCUMENTS

| | | | |
|---|---|---|---|
| 5,722,053 A * | 2/1998 | Kornfeld et al. | 455/86 |
| 6,381,471 B1 * | 4/2002 | Dvorkin | 455/552.1 |
| 6,754,508 B1 * | 6/2004 | Pau | 455/552.1 |
| 2002/0049075 A1 * | 4/2002 | Takagi | 455/553 |
| 2002/0183025 A1 * | 12/2002 | Seaberg et al. | 455/132 |

FOREIGN PATENT DOCUMENTS

| | | |
|---|---|---|
| DE | 10035116 | 1/2002 |
| WO | 0041325 | 7/2000 |
| WO | WO 00/41325 | * 7/2000 |

* cited by examiner

*Primary Examiner*—Lee Nguyen
(74) *Attorney, Agent, or Firm*—Kam T. Tam; Charles Brown; Thomas R. Rouse (57) ABSTRACT

A method and apparatus are disclosed for a wireless communication device to simultaneously receive at least two signals. Two receiver portions are provided in the wireless communication device. A first receiver portion is configured to receive a first communication signal. A second receiver portion is configured to receive a second communication signal. The two receiver portions are configured to convert the first and second communication signals to a common frequency band. The common frequency band may be an intermediate frequency band or baseband frequency band. The converted first and second communication signals are combined in the common frequency band using an adder or other signal combiner. The combined signal is processed in a single signal processor. The communication device is able to resolve each of the received signals when the first communication signal is a narrowband signal and the second communication signal is a wideband signal, such as a spread spectrum signal.

27 Claims, 4 Drawing Sheets

SHARED RECEIVE PATH FOR SIMULTANEOUS RECEIVED SIGNALS

BACKGROUND OF THE INVENTION

1. Field of the Invention

The invention relates to wireless communication devices. More particularly, the invention relates to receivers in multimode wireless communication devices.

2. Description of the Related Art

A vast array of wireless communication devices is available for consumer use. The communication devices include pagers, two-way radios, and wireless phones, such as cordless phones, cellular phones, and personal communications service (PCS) phones.

The multiple wireless devices typically operate in different frequency bands and different communication systems that operate according to detailed specifications. Within a particular type of wireless communication device there may be a number of different specifications that make it difficult for a single device to operate in more than one communication system. For example, in the field of wireless phones there are numerous specifications and standards.

Wireless phone systems may be based on code division multiple access (CDMA), time division multiple access (TDMA), orthogonal frequency division multiplexing (OFDM), frequency modulation (FM), or some other modulation techniques. A wireless phone configured to operate within a Global System for Mobile Communications (GSM) system may be inoperable in a CDMA system.

A GSM system is typically designed to support one or more GSM standards, such as the standards offered by the "3rd Generation Partnership Project (3GPP)" and embodied in the 3GPP specification where the term "3GPP specification" refers to all GSM specifications including those covering GSM Evolution (GSM EDGE), Global Packet Radio Service (GPRS), and GSM 3G. The 3GPP specification is provided in a set of documents provided by Technical Specification Groups (TSG) including specifications in series 01 through 13 for GSM only prior to Rel-4, series 21 through 35 for 3G/GSM R99 and later, and series 41 through 52 for GSM only for Rel-4 and later.

A CDMA system may be designed to support one or more CDMA standards such as (1) Telecommunications Industry Association (TIA)/Electronic Industries Association (EIA) "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) other standards.

Currently wireless devices, such as a wireless phone, may operate in a first mode but be capable of operating in a plurality of operating modes. When signal quality for a communication link using the first mode may degrades to an unacceptable quality of service, the wireless device can attempt to hand off the communication link from a base station in a first cell to a base station in a second cell. However, the second base station may operate in a different operating mode than the first base station. Thus it may not be possible for the wireless device to remain in the first operating mode. In such a case, the wireless device may need to negotiate a hand off to a base station using a second operating mode. Unfortunately, the first and second operating modes may use communication channels in different frequency bands and may also use incompatible modulation techniques.

As an example, a wireless phone operating in a GSM mode may establish a communication link in a first frequency band with a GSM base station. The wireless phone may then move to the edge of the GSM base station coverage area such that the quality of service of the communication link is degraded. The wireless phone may attempt to hand off the communication link to another GSM base station, but there may not be any other GSM base station that can provide a communication link having an improved quality of service. However, there may be a UMTS base station operating in a WCDMA mode that is able to provide to the wireless phone a communication link having an improved quality of service. However, the UMTS base station may operate in a frequency band that is different from the frequency band used by the GSM base station. Additionally, the WCDMA operating mode requires significantly different signal processing than the GSM operating mode.

The UMTS specification includes provisions for implementing a hand off from a WCDMA operating mode to a GSM operating mode. For example, one manner of accomplishing an inter-mode hand off is by using a compressed mode of operation. In compressed mode the WCDMA information is compressed into a segment of time to allow the wireless phone to simultaneously receive both GSM and WCDMA communications in a time duplexed manner. However, operating in the compressed mode is highly complex. Information in the WCDMA uplink and downlink are compressed to allow time division duplex operation. Additionally, the GSM operating mode uses time division duplex operation. The timing issues that must be controlled in the compressed operating mode make it difficult to implement a wireless phone using compressed mode.

In a second example, the wireless phone may implement two distinct receivers. A first receiver may operate in the GSM operating mode and the second receiver may operate in the WCDMA operating mode. The GSM and WCDMA receivers operate independently to receive and demodulate the respective signals. However, this design occupies a large volume within the wireless phone and minimizing total volume of the wireless phone is desired. Additionally, the two receivers operate simultaneously for only brief periods of time when the phone is negotiating an inter-mode hand off. Thus, the two receiver implementation provides a receiver that is idle for the majority of time. The additional parts needed for the two receiver implementation also increase the total cost of manufacturing the wireless phone.

Thus, what is needed is a manner of configuring a wireless device, such as a wireless phone, to simultaneously operate in multiple modes. The wireless device should be able to simultaneously communicate over multiple communication links using multiple communication modes. A wireless phone using the configuration should be able to simultaneously operate in a GSM mode and a WCDMA mode without using compressed mode. Thus, the wireless phone should be able to negotiate an inter-mode hand off without operating in compressed mode.

SUMMARY OF THE INVENTION

A method and apparatus are disclosed for a wireless communication device to simultaneously receive at least two signals. Two receiver portions are provided in the wireless communication device. A first receiver portion is configured to receive a first communication signal. A second receiver portion is configured to receive a second communication signal. The two receiver portions are configured to convert the first and second communication signals to a common frequency band. The common frequency band may be an intermediate frequency band or baseband frequency band. The converted first and second communication signals are combined in the common frequency band using an adder or other signal combiner. The combined signal is processed in a signal processor. The communication device is able to extract information from each of the received signals when the first communication signal is a narrowband signal and the second communication signal is a wideband signal, such as a spread spectrum signal.

In one embodiment a wireless device is disclosed. The wireless device includes a first receiver portion configured to convert a first signal to a first converted signal and a second receiver portion configured to convert a second signal to a second converted signal. The first converted signal is in a first frequency band that overlaps, at least in part, a second frequency band corresponding to the second converted signal. The wireless device also includes a combiner to combine the first converted signal with the second converted signal and a signal processor configured to process the combined first and second converted signals.

In another embodiment, a method is disclosed. The method includes converting a received first signal to a first converted signal in a first frequency band and converting a second signal to a second converted signal in a second frequency band. At least a portion of the first frequency band overlaps a portion of the second frequency band. The method also includes combining the first converted signal with the second converted signal and processing the combined first and second converted signal.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

DETAILED DESCRIPTION OF THE PREFERRED EMBODIMENT

A method and apparatus configured to simultaneously receive multiple signals using a shared receive path are disclosed. Using the method or apparatus, a WCDMA signal may be received and converted to a WCDMA baseband signal. Simultaneously, a GSM signal may be received and converted to a GSM baseband signal. At least a portion of the bandwidth occupied by the WCDMA baseband signal overlaps a portion of the bandwidth occupied by the GSM baseband signal. The two baseband signals are then combined into a combined baseband signal. A first baseband processor operates on the combined signal to extract information from the WCDMA signal component of the combined signal. Similarly, a second baseband processor operates on the combined signal to extract information from the GSM signal component of the combined signal. Accordingly, devices implementing the apparatus can simultaneously receive both GSM and WCDMA signals and therefore easily handoff between base stations operating in different modes.

Figure 1:
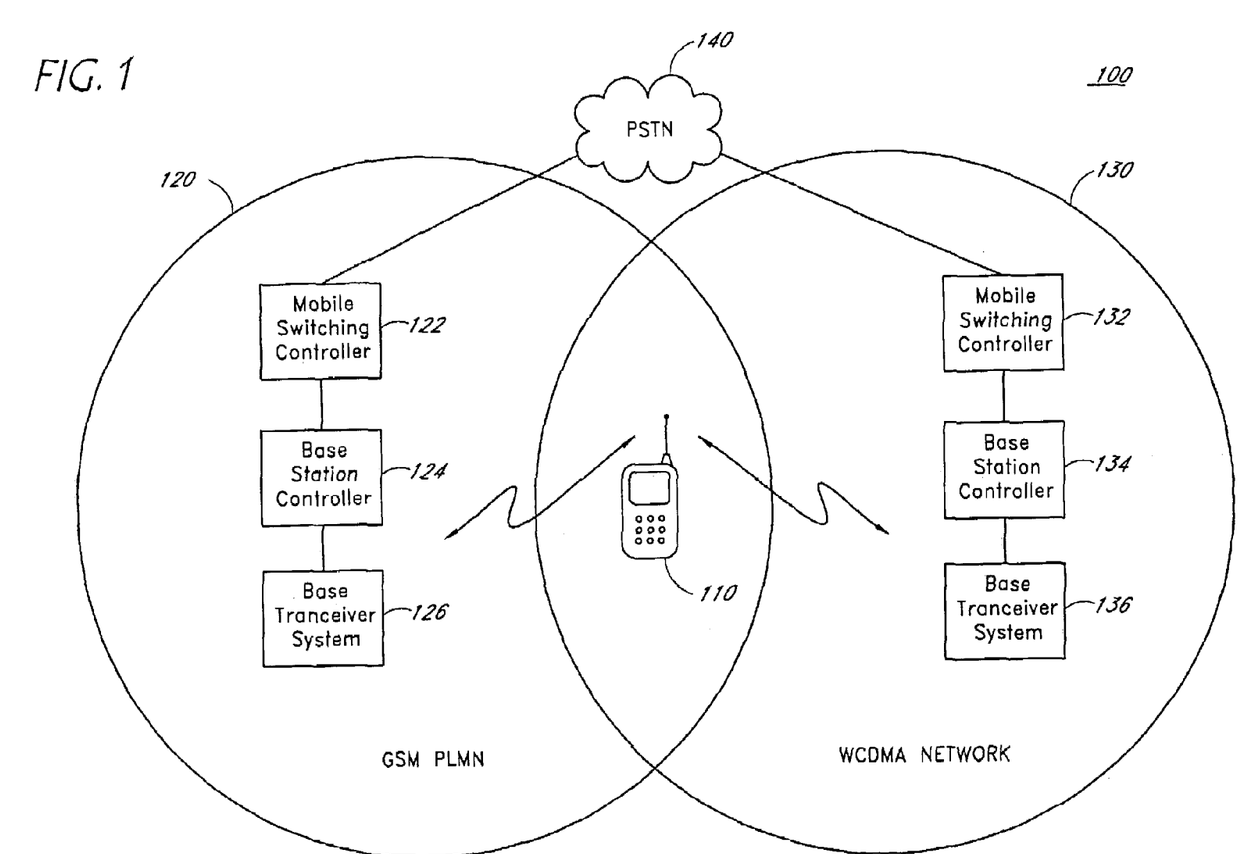
FIG. 1 is a functional block diagram of an embodiment showing a wireless device operating in a multimode environment.

A wireless device 110 configured with some or all of the methods and devices disclosed herein is shown in FIG. 1. The wireless device 110 is shown operating in a multiple mode communication system 100.

The wireless device 110 is illustrated in a coverage area 120 supported by a first wireless communication system. For example, the first wireless communication system may be a GSM system such as the GSM Public Land Mobile Network (PLMN). The illustrated GSM PLMN comprises a GSM Base Transceiver System (BTS) 126 connected with a GSM Base Station Controller (BSC) 124 which is in turn connected to a GSM Mobile Switching Controller (MSC) 122. The GSM MSC 122 is in communication with a Public Switched Telephone Network (PSTN) 140 to route calls from the wireless network to wired telephones.

The wireless device 110 also communicates with the GSM BTS 126 when the wireless device 110 is operating in GSM mode. The wireless device 110 communicates with the GSM BTS 126 in accordance with the appropriate GSM system specification and according to the specified GSM air interface parameters.

The GSM BTS 126 typically defines a cell having a coverage area smaller than the GSM PLMN coverage area 120. Typically, a plurality of GSM BTS's 126 are used in the GSM PLMN. One or more GSM BTS's 126 may be connected to a GSM BSC 124. The GSM BSC 124 is used to control the operation of the one or more GSM BTS 126. The GSM BSC 124 may, for example, handle the handoff between GSM BTS 126 within the system. The GSM BSC 124 may also handle the set up and tear down of radio channels in the GSM system.

One or more GSM BSC's 124 are connected to the GSM MSC 122. The GSM MSC 122 acts like a normal switching node of the PSTN 140, and in addition provides functionality needed to support the wireless device 110. The functions may include registration, authentication, MSC handoffs, and call routing to a roaming subscriber. The GSM MSC 122 also provides the interface from the GSM network to the PSTN 140. Thus, a wireless device 110 operating in the GSM PLMN area 120 could easily communicate with a device connected to the PSTN 140.

The wireless device 110 may also be configured to operate in a Universal Mobile Telecommunications System (UMTS). The UMTS may comprise a UMTS Terrestrial Radio Access Network (UTRAN). As illustrated, the UTRAN may support Wideband Code division Multiple Access (WCDMA) communications. The WCDMA network has a corresponding WCDMA network coverage area 130 that may overlap the GSM PLMN coverage area 120. The WCDMA network may be configured using a structure that is very similar to the structure used by the GSM PLMN.

However, the actual interfaces and protocols used in the WCDMA network may be very different from those used in the GSM PLMN. Thus, a conventional device configured to operate in the GSM system may not have the ability to operate in the WCDMA system.

However, the wireless device 110 is designed to operate in more than one communication system. The WCDMA system is considered to be more advanced than a GSM system. However, the roll out of WCDMA systems is likely to be performed in phases and there is the possibility of coverage area holes in a WCDMA system. However, most areas will continue to be supported by a legacy GSM network. The wireless device 110 may be configured to operate in both communication systems to allow it to operate on legacy GSM systems when a preferred WCDMA system is not available.

The wireless device 110 communicates with a WCDMA BTS 136 when communicating with the WCDMA network. The communication between the wireless device 110 and the WCDMA BTS 136 is defined in one or more WCDMA system specifications. The wireless device 110 typically communicates with the WCDMA BTS 136 over a radio channel using a defined air interface. As was the case for the GSM BTS 126, the WCDMA BTS 136 typically defines the coverage area of a cell within the WCDMA network. The WCDMA network typically includes a plurality of WCDMA BTS 136 configured to provide the complete WCDMA coverage area 130.

Each WCDMA BTS 136 is connected to a WCDMA BSC 134. The frequencies used by the WCDMA BTS to communicate with the wireless device 110 are typically different from the frequencies used by the GSM BTS 126. More than one WCDMA BTS 136 may be connected to the same WCDMA BSC 134. The WCDMA BSC 134, in a function similar to that of the GSM BSC 124, controls the WCDMA BTS 136 to which it is connected. The WCDMA BSC 134, for example, may control the handoffs between WCDMA BTS 136.

The WCDMA BSC 134 is in turn connected to a WCDMA MSC 132. More than one WCDMA BSC 134 may connect to the same WCDMA MSC 132. The WCDMA MSC 132 provides functions needed to support the wireless device 110. The functions may include registration, authentication, MSC handoffs, and call routing to a roaming subscriber. The WCDMA MSC 132 also provides the interface from the WCDMA network to the PSTN 140. Similar to the case in the GSM PLMN, the WCDMA MSC 132 is connected to the PSTN 140.

A wireless device 110 that is travelling out of a WCDMA coverage area 130 may be within a GSM coverage area 120. The wireless device 110 may determine that the quality of service provided by the WCDMA BTS 136 is degrading. Ordinarily, the wireless device 110 and the WCDMA system would determine a different WCDMA BTS to which the communication link with the wireless device 110 should hand off. However, when the wireless device 110 is moving away from the WCDMA coverage area 130, there is no WCDMA BTS for which a handoff would improve the quality of service. A wireless device 110 that is only capable of operating in a WCDMA communication mode would typically lose service once it has traveled outside of the WCDMA coverage area 130.

However, the wireless device 110 is configured to operate in a plurality of communication modes. The wireless device 110 is able to scan for GSM system signals to allow a hand off, or "hand over" as it is alternatively referred, to a BTS 126 in the GSM system. Instead of operating in compressed mode, the wireless device 110 is configured to simultaneously receive and process signals from both the WCDMA and GSM systems as described in detail below. The wireless device 110 is configured with two receiver sections operating in parallel. The outputs of the two receiver sections are combined into a common signal. The common signal may be converted into a digital representation in a single Analog to Digital Converter (ADC). The digitized signal may then be processed in parallel by baseband processors configured to process GSM and WCDMA signals.

Combining the received WCDMA signal with the received GSM signal provides a number of advantages with only minor disadvantages. One distinct advantage is the need for only one ADC. Two ADC's are required if the WCDMA and GSM signals are processed in distinct receivers. Additionally, where the baseband processors and the ADC are configured in an integrated circuit (IC), such as an Application Specific Integrated Circuit (ASIC), the pinout of the ASIC may be the same for an ASIC supporting a single mode design and an ASIC supporting a multiple mode design. A single ASIC pinout allows a common device design to be configured for multiple mode operation or single mode operation.

For example, a wireless phone may be designed for dual mode, WCDMA and GSM, operation. The phone design may include two receive portions, or sections, and the output of the receive portions may be combined into a common signal. The common signal may then be connected to an ADC of an ASIC that is configured to process WCDMA and GSM signals simultaneously. The wireless phone may be reconfigured to operate in only a single mode by replacing the multiple mode ASIC with a single mode ASIC having an identical pinout. The devices that are used in the second receive section may be omitted. The receive section remaining corresponds to the single mode of operation. Thus, one wireless phone design may be configured for single mode or multiple mode operation.

A wireless device configured to simultaneously operate in multiple modes is discussed in more detail below with reference to a functional block diagram. An embodiment of a dual mode receiver 200 for a multimode wireless device is shown in the functional block diagram of FIG. 2.

Figure 2:
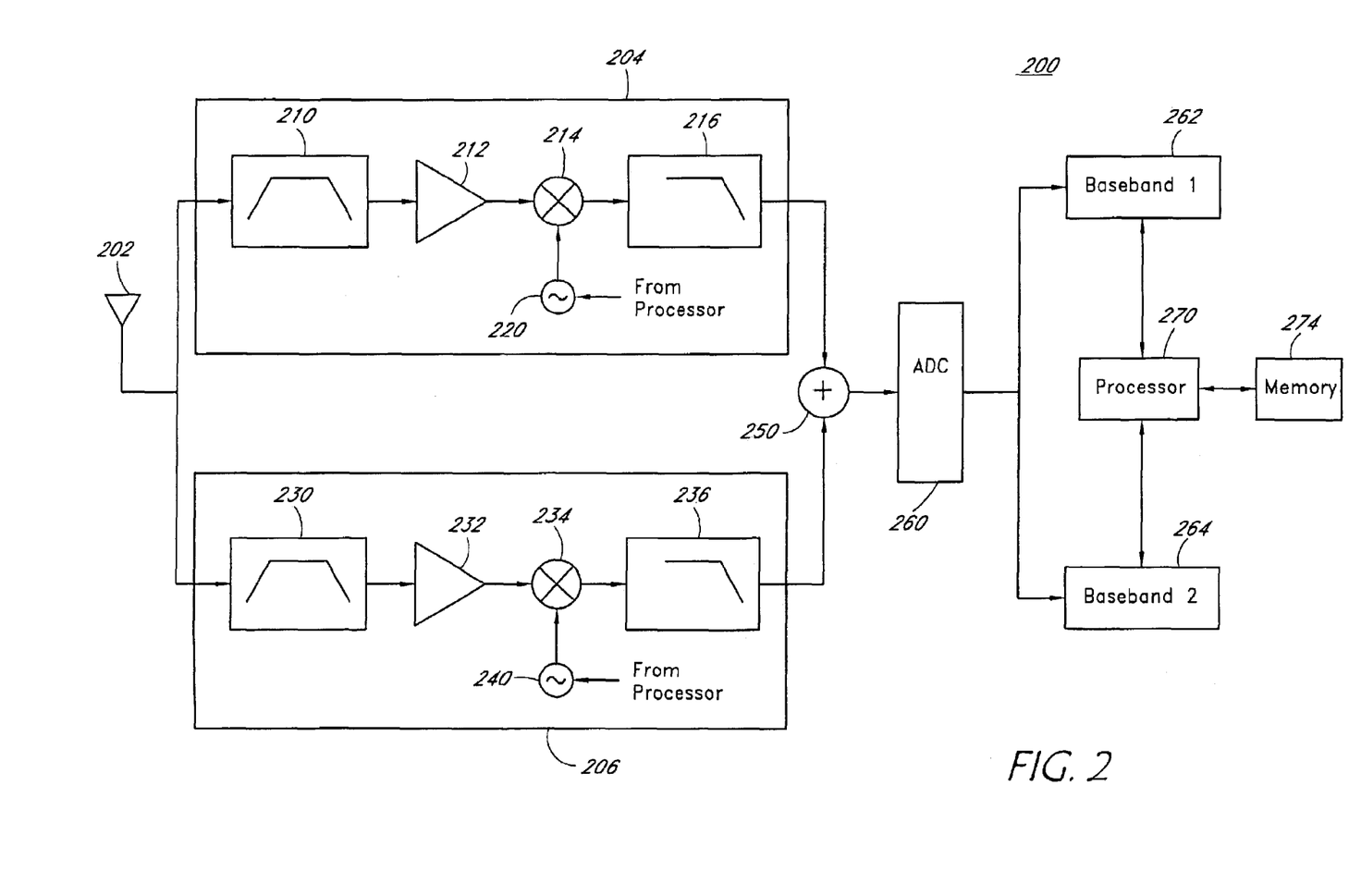
FIG. 2 is a functional block diagram of an embodiment showing a wireless device configured to simultaneously communicate in two operating modes.

The dual mode receiver 200 has a first receiver configured to receive a first signal and convert it to a first baseband signal. The first signal may be modulated with information, such as voice traffic or data. The dual mode receiver 200 also has a second receiver configured to receive a second signal and convert it to a second baseband signal. The second signal may also contain similar voice, data, timing or other information. The first baseband signal is combined with the second baseband signal and the combined signal is digitized. The digitized combined signal is then processed by first and second baseband processing modules in order to extract the information contained in the first and second received signals.

The dual mode receiver 200 includes an antenna 202 to interface with transmitted wireless signals. The antenna 202 typically is designed to receive signals from at least two frequency bands. The two frequency bands may be mutually exclusive or may have overlapping portions. A first frequency band may include a first signal. Similarly, a second frequency band may include a second signal. For example, the first frequency band may be the receive frequency band for WCDMA signals and the second frequency band may be the receive frequency band for GSM signals. The antenna 202 may comprise a single antenna or may comprise a plurality of antennas. When the antenna 202 comprises a plurality of antennas, each antenna may receive a portion, or the entirety, of the desired receive frequency bands.

The output of the antenna 202 is connected to the inputs of first and second receivers. The output of the antenna 202 connects to a first RF filter 210. The first RF filter 210 may be used to reduce the received signal bandwidth to a first frequency band. The output of the first RF filter 210 is connected to a first RF amplifier 212. The first RF amplifier 212 is used to increase the amplitude of the received signal. The first RF amplifier 212 may be a low noise amplifier (LNA). The first RF amplifier 212 may comprise multiple amplifiers that may be configured in any combination of series and parallel configurations. Additionally, the first RF amplifier 212 may be a variable gain amplifier. Some or all of the amplifiers used in the first RF amplifier 212 may be variable gain amplifiers when the first RF amplifier 212 comprises multiple amplifiers. The variable gain amplifiers may receive a control signal from an Automatic Gain Control (AGC) loop (not shown) that is used to maintain a signal amplitude at some point within the dual mode receiver 200.

The output of the first RF amplifier 212 is connected to an input of a first mixer 214. In the configuration shown in FIG. 2, the first mixer 214 is used to downconvert the first received signal to a first baseband signal. Thus, typically, the output of the first RF amplifier 212 is connected to an RF input of the first mixer 214.

A first local oscillator 220 is used to generate a reference signal used to frequency convert the first RF signal to a first baseband signal. The output frequency of the first local oscillator 220 signal is determined in part on the characteristics of the first RF signal. For example, the local oscillator frequency may correspond to the center frequency of the first RF signal if the first RF signal is a double sided signal. Alternatively, the local oscillator frequency may correspond to frequency of the upper or lower band edge of the first RF signal when the first RF signal is a single sided signal. In another alternative, the local oscillator frequency may correspond to some frequency within the bandwidth of the first RF signal, such as, for example, when the first RF signal is a vestigial sideband signal.

The first local oscillator 220 is typically a programmable frequency oscillator, such as a synthesized frequency oscillator. The frequency of operation is typically determined by one or more control signals provided by a processor 270. Thus, the first local oscillator 220 may be programmed by the processor 220 to the frequency that results in the first RF signal being downconverted to a baseband signal. The output of the first local oscillator 220 is typically connected to a local oscillator port of the first mixer 214.

The output of the first mixer 214 includes the desired first baseband signal as well as other mixer products. An ideal mixer provides an output signal that has components at the sum and difference of the frequency of the signals provided to the RF and local oscillator ports. A non-ideal mixer may also output signals at other frequencies due to higher order mixer products. The output of the first mixer 214 is connected to a first baseband filter 216 that is used to remove the undesired mixer products.

The first baseband filter 216 is typically configured as a lowpass filter in order to pass the desired first baseband signal and reject other undesirable mixer products. For example, a lowpass filter rejects the mixer product that is at the frequencies that correspond to the sum of the RF signal frequencies with the local oscillator frequency. Although the first baseband filter 216 is shown as a lowpass filter, it may also be configured as another filter type. The most common alternative is to configure the first baseband filter 216 as a bandpass filter. However, the first baseband filter 216 may be configured as any filter type. The output of the first baseband filter 216 is connected to a first input of a signal combiner.

Returning to the antenna 202, it may be seen that the output of the antenna 202 is also connected to a second receiver that is configured using a topology that is similar to the first receiver. The output of the antenna 202 connects to the input of a second RF filter 230. The second RF filter 230 is used to reduce the received signal bandwidth to a second frequency band. The output of the second RF filter 230 is connected to the input of a second RF amplifier 232. As was the case with the first RF amplifier 212, the second RF amplifier 232 may be an LNA and may be configured as one or more amplifiers. Additionally, the second RF amplifier 232 may be a variable gain amplifier that is used as part of an AGC loop (not shown). The output of the second RF amplifier 232 is connected to an RF input port of a second mixer 234.

The second mixer 234 is used to frequency convert the received second RF signal to a second baseband signal. A frequency reference from a second local oscillator 240 is provided to a local oscillator port of the second mixer 234. The second local oscillator 240 may be configured as a programmable oscillator. The frequency of the second local oscillator 240 may be programmed by the processor 270. The frequency of the second local oscillator 240 is determined in part on the characteristics of the second RF signal. The output frequency of the second local oscillator 240 is typically different from the frequency of the first local oscillator 220. The frequency of the second local oscillator 240 is programmed such that the output of the mixer includes the second baseband signal.

The second mixer 234 mixes the second RF signal with the second local oscillator 240 signal. The output of the second mixer 234 includes the desired second baseband signal along with other undesired mixer components. The output of the second mixer 234 is connected to a second baseband filter 236.

The second baseband filter 236 is used to attenuate the undesired mixer products such that the second baseband signal is substantially the only mixer product remaining. The second baseband filter 236 is typically a lowpass filter. The passband of the second baseband filter 236 is typically different from the passband of the first baseband filter 216. The output of the second baseband filter 236 is connected to a second input of the combiner 250.

As the name implies, the combiner 250 is used to combine the first baseband signal with the second baseband signal. The output of the combiner 250 is a single combined baseband signal. The combiner 250 is shown in FIG. 2 as a summer. A summer adds the amplitude of the first baseband signal with the amplitude of the second baseband signal. However, phase inversions of one or both of the signals may result in a combiner 250 that is a subtracter. The combiner 250 may be configured as an active or passive device and may combine signals with equal weighting or may weight one input signal more heavily than the other.

The output of the combiner 250 is connected to an Analog to Digital Converter (ADC). The ADC is used to digitize the combined baseband signal such that it may be digitally processed in subsequent stages. Note that only a single ADC is needed for the combined baseband signal whereas two ADC are needed if the dual mode receiver 200 is configured as two separate and distinct receivers.

The ADC 260 for the dual mode receiver 200 is typically different from an ADC in a single mode receiver. The dynamic range of the ADC 260 in the dual mode receiver 200 is preferably slightly higher than the dynamic range of an ADC in a single mode receiver because the ADC 260 in the dual mode receiver 200 digitizes a signal that is the sum of two baseband signals. The ADC 260 used in the dual mode receiver 200 design may be the same as the ADC used in a single mode design depending on headroom and saturation requirements of the particular dual mode receiver 200 design.

The digitized combined baseband signal is output from the ADC 260 and connected to a first baseband processor 262 and a second baseband processor 264. The first baseband processor 262 is used to extract the information from the first baseband signal, such as a WCDMA signal. The second baseband processor 264 is used to extract the information from the second baseband signal, such as a GSM signal. The first and second baseband processors 262 and 264 are configured to extract the information from the respective baseband signals. The information may include voice, data, control, timing, or other signals contained within the first baseband signal. The information may be voice signals for a call or may be system information needed for conducting a hand off. The baseband processors 262 and 264 are able to accomplish this even though the baseband signal is a component of the combined baseband signal.

The first baseband processor 262 is connected to the processor 270 that is connected with memory 274. Similarly, the second baseband processor 264 is also connected to the processor 270. The memory 274 may comprise one or more processor readable storage devices. The memory 274 may include program code for instructing the processor to perform some or all of the various signal processing functions within the dual mode receiver 200. The processor 270 may comprise one or more processing devices. The processor 262 may perform the functions of the first and second baseband processors 262 and 264. Of course, the memory 274 may be integrated into the same physical integrated circuit as the processor 270 without departing from the invention.

The operation of the dual mode receiver 200 and the ability of the baseband processors 262 and 264 to extract information from the combined baseband signal may be further detailed by way of a specific example. In the example, the dual mode receiver 200 is configured to simultaneously receive and demodulate signals from a GSM system and a WCDMA system.

The dual mode receiver 200 is able to simultaneously receive transmitted signals from both a WCDMA system and a GSM system when the receiver is in a location supported by both systems. The antenna 202 receives both the WCDMA and GSM transmissions and couples the received transmissions to the first and second receivers.

In this example, the first receiver is configured to downconvert WCDMA RF signals to baseband signals. The first RF filter 210 passes signals in the WCDMA receive frequency band and attenuates signals outside of the frequency band. The WCDMA receive band may support one or more WCDMA channels. Each WCDMA channel is approximately five (5) Megahertz wide. For example, the WCDMA receive band may span 2110-2170 MHz. The WCDMA signal is a direct sequence spread spectrum signal that uses a spreading rate of 3.84 Mcps. The first RF amplifier 212 is an LNA that amplifies the filtered WCDMA signal. The output of the first RF amplifier is provided to the RF input of the first mixer 214.

The processor 270 programs the first local oscillator 220 to a frequency that downconverts one WCDMA channel to baseband. If the WCDMA RF signal is in the band of 2110-2115 MHz, the first local oscillator 220 may be programmed to output a signal having a frequency of 2110 MHz. The output of the first local oscillator 220 may be tuned to a different frequency to provide a different baseband signal. The local oscillator signal is provided to the local oscillator port of the first mixer 220.

The first mixer 214 downconverts the WCDMA RF signal to a baseband signal. Using the above frequencies, the WCDMA signal is converted to a baseband signal in the frequency band of 0-5 MHz.

The output of the first mixer 220 is provided to the first baseband filter 216 to attenuate the undesired mixer components. Additionally, the first baseband filter 216 may be used to attenuate the signals from adjacent channels. The first baseband filter 216 may be a lowpass filter having a passband of approximately 5 MHz. The output of the first baseband filter 216 is connected to a first input of the combiner 250.

The received RF signals are also coupled from the output of the antenna 202 to the input of a second receiver. The second receiver is configured to downconvert GSM RF signals to baseband signals.

The received RF signals are coupled to the second RF filter 230. The second RF filter is used to pass signals in a GSM receive band while attenuating signals outside of the GSM receive band. For example, the second RF filter 230 may have a passband that includes 935-960 MHz. Multiple channels are supported within the GSM receive band. Each of the GSM channels is 200 KHz wide and is time division multiplexed between multiple users.

The filtered output from the second RF filter 230 is coupled to the second RF amplifier 232. The second RF amplifier 232 amplifies the signals in the filtered GSM receive band and provides the amplified signals to the RF port of the second mixer 234.

The processor 270 programs the second local oscillator 240 to a frequency that is used to downconvert one of the received GSM channels to baseband. For example, if the desired GSM channel is within the band of 935.4-935.6 MHz, the processor 270 may program the second local oscillator 240 to provide an output signal at a frequency of 935.4 MHz.

The output of the second local oscillator 240 is provided to a local oscillator port of the second mixer 234. The second mixer 234 is used to frequency convert the GSM RF signal. If the GSM RF signal is a frequency hopping signal, the output of the second local oscillator 240 frequency hops in order to maintain a baseband signal. The second mixer 234 mixes the received RF signal with the local oscillator signal and produces an output signal that includes the desired GSM baseband signal. The output of the second mixer 234 is connected to the second baseband filter 236. The second baseband filter 236 attenuates the undesired mixer products and attenuates the downconverted signals from adjacent GSM channels. The second baseband filter 236 has a passband of about 200 KHz. The filtered GSM signal is a baseband signal in the frequency band of 0-200 KHz. The filtered GSM baseband signal is provided to a second input of the combiner 250.

The combiner 250 is a summer that adds the amplitude of the WCDMA baseband signal to the amplitude of the GSM baseband signal. The combined signal has a frequency spectrum that is the sum of the frequency spectrums of the WCDMA and GSM baseband signals. Thus, the combined baseband signal includes the 5 MHz wide WCDMA baseband signal summed with the 200 KHz wide GSM signal. The GSM baseband signal thus shares the 0-200 KHz frequency band with the WCDMA signal. The combined signal is then provided to an ADC 260.

The ADC 260 digitizes the combined signal and provides the digitized signal to two different baseband processors 262 and 264. The first baseband processor 262 extracts the information from the WCDMA signal. The first baseband processor 262 is configured to demodulate the WCDMA signal.

The dual band receiver 200 takes advantage of the different properties of the two received signals. The WCDMA signal is a direct sequence spread spectrum (DSSS) signal while the GSM signal is a Gaussian Minimum Shift Keyed (GMSK) signal.

The first baseband processor 262 performs a despreading operation on the combined baseband signal as part of the demodulation process. The despreading operation may be performed using a matched filter or a correlator. The GSM signal component within the combined baseband signal is not correlated to the WCDMA signal. Thus, the GSM signal component appears as an uncorrelated noise component of the WCDMA signal. The effect of processing the combined baseband signal rather than solely the WCDMA baseband signal is a slight decrease in the ratio of the energy per bit to noise power spectral density (Eb/No).

The second baseband processor 264 performs GMSK demodulation as part of the baseband processing of the GSM signal. As discussed earlier, the combined baseband signal has a bandwidth of about 5 MHz due to the inclusion of the WCDMA signal. However, the second baseband processor 264 is only concerned with the portion of the spectrum that contains the GSM signal component. This GSM portion of the baseband signal is in the frequency band of 0-200 KHz. Thus, the second baseband processor 264 may further band limit the combined baseband signal with no loss in information. The second baseband processor 264 may filter the combined baseband signal to pass only the frequency range of 0-200 KHz. Thus, a majority of the energy from the WCDMA signal is filtered out in the second baseband processor 264. The WCDMA signal appears as uncorrelated noise distributed in the signal bandwidth because the WCDMA signal is a DSSS signal. Thus, the WCDMA signal only contributes to a slight rise in the noise floor for the GSM signal.

Using a numerical example, independent AGC loops for the WCDMA and GSM receivers may each control the baseband power of the respective signals. The AGC loops may be set such that the baseband signal level of each of the receivers is the same, for example 1 mW (0 dBm). Then the combined baseband output power is the sum of the WCDMA and GSM baseband power. The combined power is 2 mW (3 dBm). However, the WCDMA signal appears as white noise and is uniformly distributed across the signal bandwidth. Thus, the 1 mW from the WCDMA signal is uniformly distributed across 5 MHz. Thus, the WCDMA signal density is 1 mW/5 MHz, or 0.2 E-9 W/Hz (−67 dBm/Hz). This signal density translates into a power level of 0.04 mW (−14 dBm) in a 200 KHz bandwidth. Thus, the signal level of the GSM baseband signal is about 25 times higher than the WCDMA signal level in the GSM signal bandwidth. The GSM signal power may be more than 25 times higher than the WCDMA signal level because the GSM signal is typically not uniformly distributed in the 200 KHz bandwidth. Thus, it may be seen that combining the WCDMA baseband signal with the GSM signal results in a slight increase in the GSM noise floor.

The use of a combined baseband signal results in slight degradation in the WCDMA and GSM signals. However, both the WCDMA baseband processor and the GSM baseband processor are able to recover the signal from their respective components of the combined baseband signal.

Figure 3:
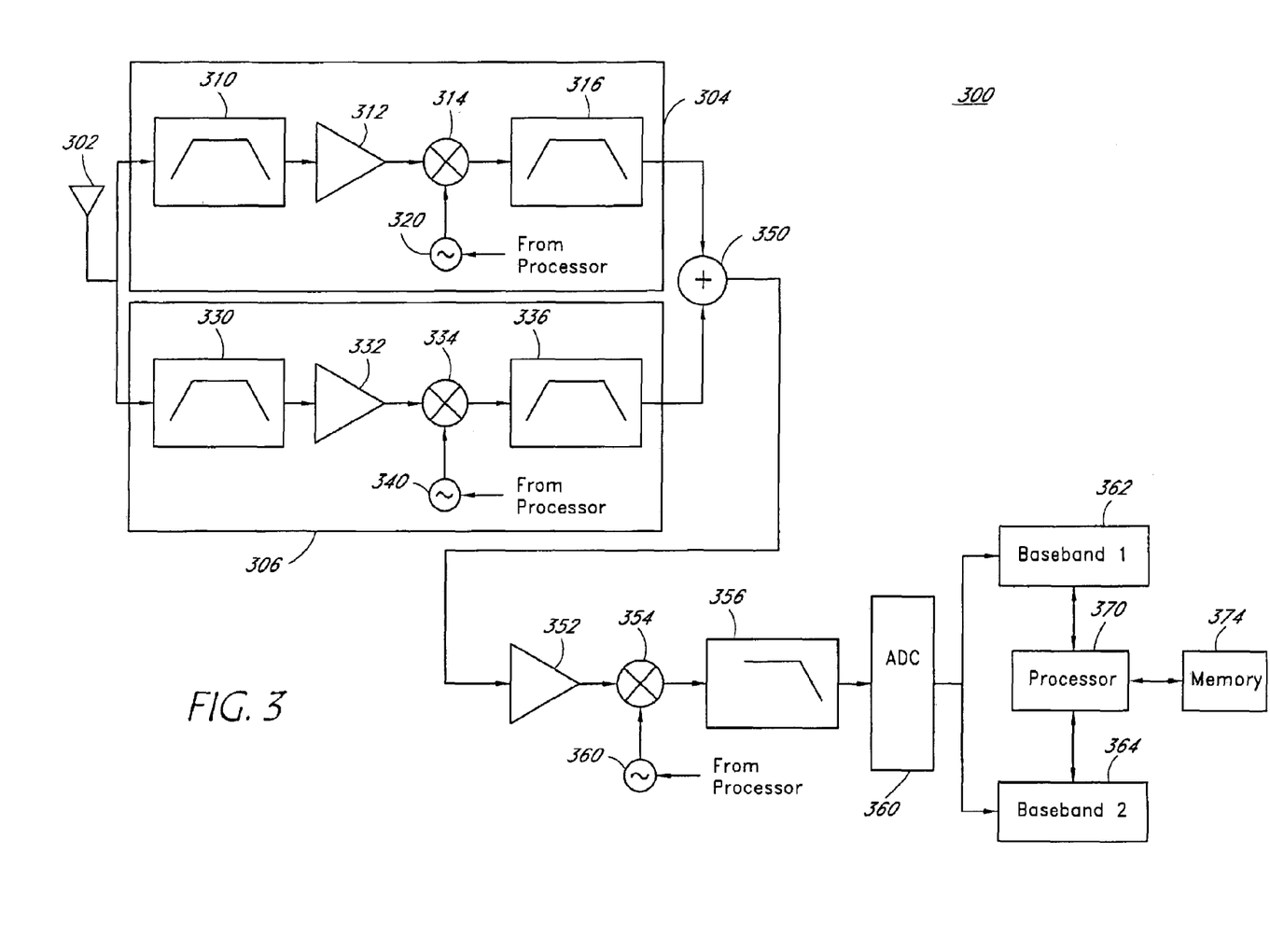
FIG. 3 is a functional block diagram of an alternative embodiment showing a wireless device configured to simultaneously communicate in two operating modes.

However, embodiments of the invention are not limited to only combining baseband signals. FIG. 3 shows a functional block diagram of a dual conversion dual mode receiver 300 embodiment using intermediate frequency (IF) combining. The RF signals from first and second RF bands are converted to first and second IF signals. The bandwidth of the second IF signal overlaps at least a portion of the bandwidth of the first IF signal. The first and second IF signals are combined and then converted in an IF stage. The IF stage converts the combined first and second IF signals into a combined baseband signal. The combined baseband signal is processed and the information on each of the first and second RF signals is extracted.

Some of the functional blocks shown in the dual mode receiver 300 embodiment of FIG. 3 are shown to be the same as was used in the embodiment shown in FIG. 2. However, the functional blocks need not be the same and may in fact be optimized for the particular receiver implementation.

The signals are received by an antenna 202 that is configured to receive at least two RF frequency bands. The two RF frequency bands correspond to the operating frequency bands for the two operating modes of the receiver 300. The antenna 202 couples the received signals to two receiver portions configured in parallel. In the dual mode receiver 300 of FIG. 3, each receiver portion performs a frequency conversion from an input RF signal to an Intermediate Frequency (IF). The IF may be at a frequency that is higher than the input RF. However, typically, the IF is at a frequency that is lower than the input RF.

The signal from the antenna 202 is coupled to a first RF filter 210. The first RF filter 210 passes the RF signals corresponding to a particular mode of operation. The first RF filter 210 is typically a bandpass filter. The output of the first RF filter 210 is connected to a first RF amplifier 312. The first RF amplifier 312 increases the amplitude of the filtered RF signal. The first RF amplifier 312 typically is implemented as an LNA. Additionally, the first RF amplifier 312 may be a variable gain amplifier used as part of an AGC loop. The output of the first RF amplifier 312 is connected to the RF input of a first mixer 314.

The first mixer 314 converts the first RF signal to a first IF signal. The local oscillator port of the first mixer 314 is connected to an output of a first local oscillator 320. The processor 270 typically programs the output frequency of the first local oscillator 320. However, a fixed frequency local oscillator may be used.

The IF port from the first mixer 314 is connected to an input of a first IF filter 316. The IF filter 316 passes the desired mixer products and attenuates the frequency components outside of the desired IF bandwidth. The RF to IF conversion may be an upconversion or a downconversion. The IF may be greater than or less than the RF. However, typically the RF to IF conversion is a downconversion and the IF is less than the RF. The output of the first IF filter 316 is connected to a first input of a combiner 350.

Returning to the antenna 202, the output of the antenna 202 is also connected to a second RF filter 230. The second RF filter 230 passes the signals corresponding to a second receiver operating mode. The output of the second RF filter 230 is connected to a second RF amplifier 332.

The amplified output from the second RF amplifier 332 is connected to the RF port of a second mixer 334. The second mixer is used to convert the second RF signal to a second IF signal. A local oscillator port of the second mixer 334 is connected to a second local oscillator 340. The processor 270 programs the output frequency of the second local oscillator 340.

The IF port of the second mixer 334 is connected to a second IF filter 336. The second IF filter 336 may have a frequency response that is the same as that for the first IF filter 316. Alternatively, the frequency response of the second IF filter 336 may be different from the frequency response of the first IF filter 316. The second IF signal typically has a bandwidth that overlaps at least a portion of the bandwidth of the first IF signal. The output of the second IF filter 336 is connected to a second input of the combiner 350.

The combiner 350 combines the two IF signals at its inputs. The combiner 350 may sum the two IF input signals or otherwise combine the two IF signals. The combiner 350 of the two IF signals may weight the two signals equally, or may weight the two IF signals differently.

The output of the combiner 350 is connected to an IF amplifier 352. The IF amplifier 352 amplifies the combined IF signal. The output of the IF amplifier 352 is connected to an IF mixer 354. The output of the IF amplifier is typically connected to the RF port of the IF mixer 354.

The IF mixer 352 is used to convert the combined IF signal from the intermediate frequency to baseband. A third local oscillator 360 generates the frequency reference used by the IF mixer 354 in frequency converting the combined IF signal. The third local oscillator 360 is typically a fixed frequency oscillator because the IF frequency is determined by the first and second local oscillators 320 and 340. Thus, the third local oscillator may be a fixed frequency oscillator. However, the third local oscillator 360 may also be a programmable frequency oscillator. The processor 270 programs the third local oscillator 360 when the frequency of oscillation is programmable. The output of the third local oscillator 360 is connected to the local oscillator port of the IF mixer 354.

The IF mixer 354 converts the combined IF signal to a combined baseband signal. The conversion is a frequency downconversion because the IF frequency is a frequency greater than 0 Hz. The output of the IF mixer 354 is the IF port. The IF port of the IF mixer 354 is coupled to baseband filter 356.

The baseband filter 356 preferably has a passband that is sufficiently wide enough to pass the desired combined baseband signal. The baseband filter 356 attenuates undesirable mixer components, adjacent channels, and noise components that are outside of the desired bandwidth. The output of the baseband filter is connected to the input of the ADC 260.

The ADC 260 and subsequent baseband processing functions performed by the dual mode receiver 300 are identical to those performed by the corresponding functional blocks discussed above with reference to FIG. 2. Thus, a detailed description of the functional blocks will not be repeated here.

The baseband processing of the combined baseband signal extracts the information contained in the first RF signal as well as the second RF signal. The information is extracted from the combined baseband signal. The baseband signal is a converted signal that derives from the received RF signals.

The dual mode receivers 200 and 300 have been described as processing a combined baseband signal. However, the signal processing may alternatively be performed at a combined IF frequency. The IF frequency may be greater than or less than one or both of the input RF signals. The combined IF signal comprises a first IF signal having a bandwidth that overlaps at least in part a bandwidth of a second IF signal. The conversion from RF to IF may be a downconversion or an upconversion.

Alternatively, one of the received signals may be converted to a baseband signal and the other of the input signals converted to an IF signal. The IF signal is then combined with the baseband signal. In the mixed IF/baseband embodiment, the bandwidth of the converted IF signal overlaps at least in part the bandwidth of the baseband signal.

Figure 4:
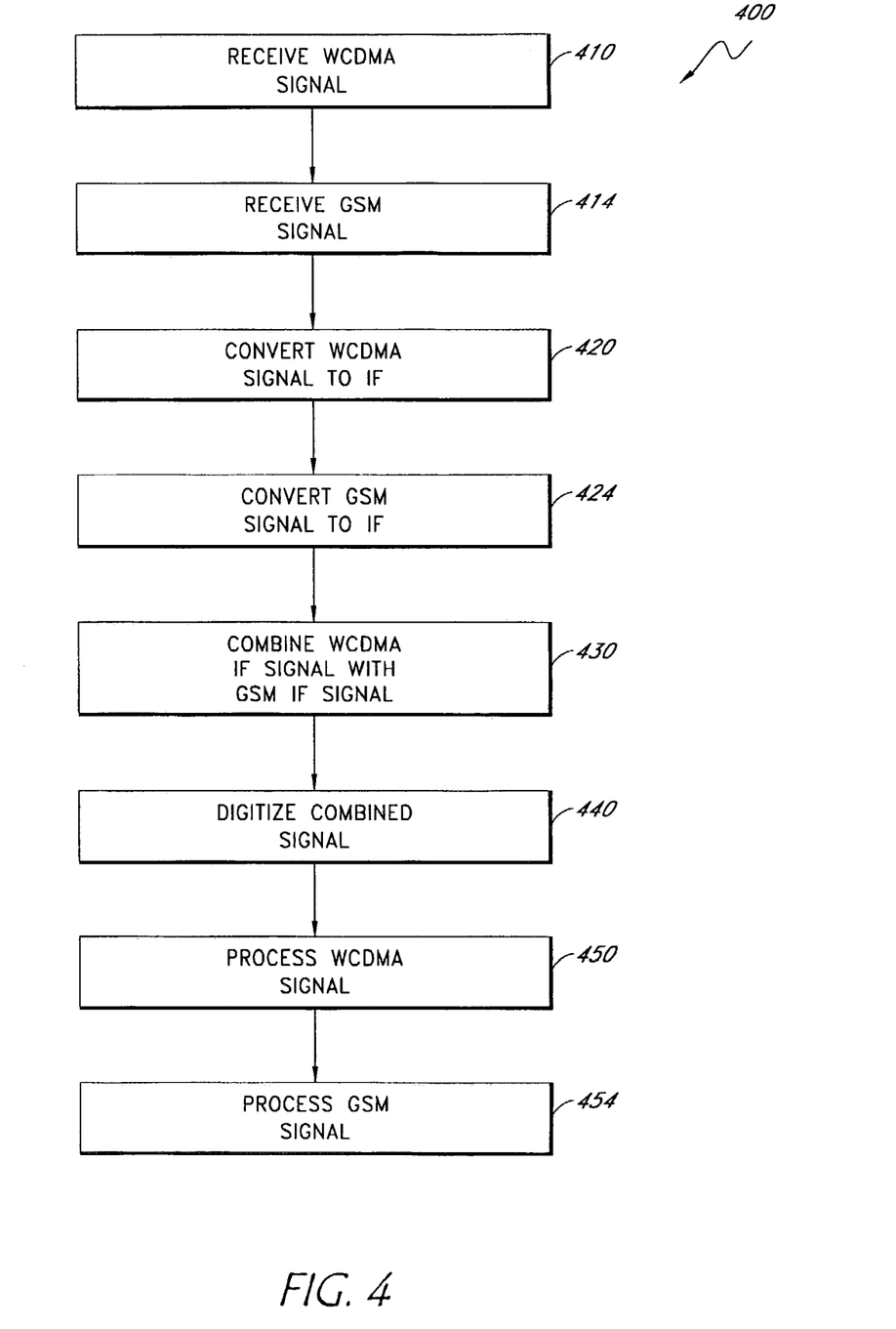
FIG. 4 is a flowchart showing an embodiment of a method of simultaneously operating a wireless device in two operating modes.

A method 400 of simultaneously receiving multiple signals using a shared receive path is shown in the flowchart of FIG. 4. The method 400 is described with respect to WCDMA and GSM signals. However, the method 400 may be generalized to a general shared receive path receiver configured to receive any two signals. The method 400 may be stored as multiple instructions or lines of code in one or more processor readable storage devices. A processor may access the instructions and perform some or all of the method in conjunction with other devices or functional blocks.

The method 400 begins at block 410 and is described in relation to a receiver configured to perform the method 400. The receiver receives a WCDMA signal in block 410. Receiving a WCDMA signal may comprise configuring an antenna to receive a receive frequency band corresponding to WCDMA signals and coupling the WCDMA signals to subsequent signal processing stages.

The receiver, in block 414, also receives GSM signals. Although block 414 is shown to occur following block 410, the order of receiving a WCDMA signal or a GSM signal is not a limitation on the method 400. In fact, the WCDMA signal and the GSM signal typically are received simultaneously.

The method 400 continues to block 420 where the received WCDMA signal is converted to an IF signal. Here, the term IF includes baseband. Thus, the receiver converts the received WCDMA signal to a converted signal that may be a baseband or higher frequency band signal. Converting the WCDMA signal to an IF signal may comprise frequency converting the WCDMA signal one or more times. Each frequency conversion may be an upconversion or a downconversion. The frequency conversion may be performed by a mixer using a programmable local oscillator. Thus, converting the WCDMA signal to an IF signal may comprise programming the local oscillator to a frequency.

At block 424, the GSM signal is converted to an IF signal. Again, here the term IF includes baseband. The conversion of the GSM signal to an IF signal may be performed before, after, or simultaneously with the conversion of the WCDMA signal to an IF signal. The GSM signal conversion may be a frequency conversion that is an upconversion or downconversion. The frequency conversion may be performed in one or more conversion stages. The frequency conversion may be performed by a mixer using a programmable local oscillator. Thus, converting the GSM signal to an IF signal may comprise programming the local oscillator to a frequency. Where the GSM signal is a frequency hopping signal, the local oscillator frequency may change to correspond with the frequency hopping signal.

The converted WCDMA and GSM signals are converted to frequencies such that at least a portion of the converted WCDMA bandwidth is overlapped by a portion of the converted GSM bandwidth. For example, the converted WCDMA signal may be in a frequency band of 0-5 MHz and the converted GSM signal may be in a frequency band of 0-200 KHz.

The method 400 proceeds to block 430 where the receiver combines the converted WCDMA signal with the converted GSM signal. The combiner may be a signal summer. The combined signal is a signal in a frequency band that encompasses both the WCDMA and GSM signals. Additionally, a portion of the bandwidth of the converted WCDMA signal overlaps at least a portion of the converted GSM signal bandwidth.

The method 400 next proceeds to block 440 where the combined signal is digitized. The combined signal is typically digitized in an Analog to Digital Converter (ADC). Thus, the combined signal is now digitally represented by a plurality of samples.

The method 400 next proceeds to block 450 where the digitized combined signal is processed. In block 450, the WCDMA signal component of the combined signal is processed. As discussed earlier with reference to FIG. 2, a signal processor, such as a baseband processor, may process the combined digitized signal. The baseband processor extracts the information from the WCDMA signal component that forms a part of the combined signal.

In block 454, the GSM signal component of the combined signal is processed. Another baseband processor extracts information in the GSM signal from the combined signal. The baseband processing of the GSM signal may occur before, after, or simultaneously with the processing of the WCDMA signal.

Thus, a method 400 has been described that allows simultaneously receiving multiple signals in a shared receive path. However, the method 400 may be modified without affecting the viability of the invention. As was discussed earlier, the order of receiving the GSM or WCDMA signals does not affect the method. Similarly, the order of converting the WCDMA and GSM signals does not affect the method. Additionally, the order of processing the converted combined signal for WCDMA and GSM information does not matter.

Additional modifications may be made to the method without affecting operability of a receiver. The digitizing operation may be performed at any stage of the receiver, although it is convenient to digitize the combined signal just before the processing stages. The digitizing operation may occur on the converted WCDMA and GSM signals independently before combination. Then the digitized WCDMA and GSM signals may be combined. The combination of the digitized signals may be performed by the processor or a dedicated combiner.

Moreover, for non-digital communication systems, the received signals may not even need to be digitized. For example, the processing of a first signal component in the combined signal may be performed in an analog rather than digital domain. Similarly, processing of a second signal component may be performed in the analog domain. Alternatively, only one of the signal components may be performed in the analog domain. The combined signal may independently be digitized and digitally processed by a second signal processor.

Thus, a multimode receiver capable of simultaneously receiving multiple signals using a shared receive path is disclosed. The receiver converts a first received signal to a first converted signal. The receiver also converts a second receiver to a second converted signal, the first and second converted signals sharing a common frequency band. The first and second converted signals are combined. A signal processor processes the combined signal and independently extracts the information from the first converted signal component of the combined signal. The signal processor also extracts information from the second converted signal component of the combined signal.

Electrical connections, couplings, and connections have been described with respect to various devices or elements. The connections and couplings may be direct or indirect. A connection between a first and second device may be a direct connection or may be an indirect connection. An indirect connection may include interposed elements that may process the signals from the first device to the second device.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a mobile device, base station, or base station controller. In the alternative, the processor and the storage medium may reside as discrete components in a mobile device, base station, or base station controller.

The above description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A wireless device comprising:
   a first receiver portion configured, during a handoff condition, to convert a first signal in a first receive frequency band to a first converted signal in a first frequency band;
   a second receiver portion configured, during the handoff condition, to convert a second signal in a second receive frequency band distinct from the first receive frequency band to a second converted signal in a second frequency band, wherein the first and second frequency bands at least partially overlap, and wherein the second receiver portion converts the second signal during at least a portion of the time that the first receiver portion converts the first signal;
   a combiner configured to combine the first converted signal with the second converted signal into a combined signal; and
   a signal processor configured to process the combined first and second converted signals to extract information from the first converted signal, wherein the signal processor is configured to process the combined signal according to a first mode and simultaneously process the combined signal according to a second mode, distinct from the first mode.

2. The wireless device of claim 1, wherein the first converted signal and the second converted signal are baseband signals.

3. The wireless device of claim 1, wherein the first converted signal and the second converted signal are intermediate frequency signals.

4. The wireless device of claim 1, wherein the signal processor comprises an Analog to Digital Converter (ADC).

5. The wireless device of claim 4, wherein the signal processor further comprises a baseband processor coupled to an output of the ADC, the baseband processor configured to extract information from a first converted signal component of the combined signal.

6. The wireless device of claim 1, wherein the first signal has a bandwidth of less than 250 KHz.

7. The wireless device of claim 6, wherein the second signal has a bandwidth of greater than 1 MHz.

8. The wireless device of claim 6, wherein the second signal has a bandwidth of greater than 3.8 MHz.

9. The wireless device of claim 1, wherein the first signal is a Time Division Multiple Access (TDMA) signal.

10. The wireless device of claim 9, wherein the second signal is a spread spectrum signal.

11. The wireless device of claim 10, wherein the second signal is a Direct Sequence Spread Spectrum (DSSS) signal.

12. The wireless device of claim 1, wherein the first signal is a Global System for Mobile Communications (GSM) signal.

13. The wireless device of claim 12, wherein the second signal is a Wideband Code Division Multiple Access (WCDMA) signal.

14. The wireless device of claim 1, wherein the combiner sums the first converted signal with the second converted signal.

15. The wireless device of claim 1, wherein the wireless device is a phone.

16. A method of processing received signals, the method comprising:
   determining a handoff condition between base stations operating in different communication modes;
   converting a first receive signal from a first base station supporting the handoff condition to a to a first converted signal in a first frequency band;
   converting a second signal from a second base station supporting the handoff condition to a second converted signal in a second frequency band, at least a portion of the first frequency band overlapping a portion of the second frequency band, and wherein converting the second signal to the second converted signal occurs during at least a portion of time that the first receive signal is converted to the first converted signal;
   combining the first converted signal with the second converted signal;
   processing the combined first and second converted signal according to a first mode; and
   simultaneously processing the combined first and second converted signal according to a second mode to extract information contained in at least one of the first and second signal.

17. The method of claim 16, wherein converting the first receive signal comprises downconverting a received Global System for Mobile Communications (GSM) signal to a first baseband signal.

18. The method of claim 16, wherein converting the first receive signal comprises downconverting a received Global System for Mobile Communications (GSM) signal to a first Intermediate Frequency (IF) signal.

19. The method of claim 16, wherein converting the second receive signal comprises downconverting a received Wideband Code Division Multiple Access (WCDMA) signal to a second baseband signal.

20. The method of claim 16, wherein converting the second receive signal comprises downconverting a received Wideband Code Division Multiple Access (WCDMA) signal to a second Intermediate Frequency (IF) signal.

21. The method of claim 16, wherein combining the first converted signal with the second converted signal comprises summing the first converted signal with the second converted signal.

22. The method of claim 16, wherein processing the combined first and second converted signal comprises:
   converting the combined first and second converted signal to a combined digital signal.

23. A wireless device comprising:
   means for converting, during a handoff condition, a received first signal in a first receive frequency band to a first converted signal in a first frequency band;
   means for converting, during the handoff condition, a second signal in a second receive frequency band distinct from the first receive frequency band to a second converted signal in a second frequency band, at least a portion of the first frequency band overlapping a portion of the second frequency band, and wherein converting the second signal occurs during at least a portion of time that the first receive signal is converted to the first converted signal;
   means for combining the first converted signal with the second converted signal; and
   means for processing the combined first and second converted signal by processing the combined signal according to a first mode and simultaneously processing the combined signal according to a second mode, distinct from the first mode.

24. One or more processor readable storage devices having processor readable code embodied thereon, the processor readable code for programming one or more processors to perform a method of processing received signals, the method comprising:

programming a first oscillator to convert, during a handoff condition, a received first signal in a first receive frequency band to a first converted signal in a first frequency band;

programming a second oscillator, distinct from the first oscillator, to simultaneously convert, during the handoff condition, a second signal to a second converted signal in a second frequency band, at least a portion of the first frequency band overlapping a portion of the second frequency band; and processing a combined signal comprising the first converted signal combined with the second converted signal by processing the combined signal according to a first mode and simultaneously processing the combined signal according to a second mode, distinct from the first mode.

25. A method of processing received signals, the method comprising:

simultaneously frequency converting a first receive signal in a first receive frequency band and a second receive signal in a second receive frequency band distinct from the first receive frequency band to a converted first signal and a converted second signal in a common frequency band;

combining the converted first signal with the converted second signal to generate a combined signal; and processing the combined signal to extract information from the converted first signal and the converted second signal, wherein processing the combined signal includes processing the combined signal according to a first mode, and simultaneously processing the combined signal according to a second mode.

26. The method of claim 25, wherein simultaneously frequency converting the first receive signal and the second receive signals comprises simultaneously frequency converting the first receive signal and the second receive signals during a handoff condition.

27. The method of claim 25, wherein the common frequency band comprises an Intermediate Frequency (IF) band.

* * * * *